US012671328B2

(12) United States Patent
Sun et al.

(10) Patent No.: US 12,671,328 B2
(45) Date of Patent: Jun. 30, 2026

(54) CONTROL CIRCUIT FOR SWITCH-MODE POWER SUPPLY, POWER CIRCUIT, AND ELECTRONIC DEVICE

(71) Applicant: Huawei Digital Power Technologies Co., Ltd., Shenzhen (CN)

(72) Inventors: Chenghao Sun, Dongguan (CN);
Baolei Dai, Dongguan (CN); Bo Wang, Shenzhen (CN); Zhiqiang Guo, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 18/350,185

(22) Filed: Jul. 11, 2023

(65) Prior Publication Data

US 2024/0030815 A1      Jan. 25, 2024

(30) Foreign Application Priority Data

Jul. 25, 2022      (CN) .......................... 202210911622.4

(51) Int. Cl.
H02M 3/156 (2006.01)
H02M 3/335 (2006.01)

(52) U.S. Cl.
CPC ............ H02M 3/156 (2013.01); H02M 3/335 (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081;
(Continued)

(56) References Cited

U.S. PATENT DOCUMENTS 8,384,362 B2 * 2/2013 Cheng ........................ G05F 1/10
                                                     323/283
9,300,212 B2 * 3/2016 Notman .............. H02M 3/1588
(Continued)

FOREIGN PATENT DOCUMENTS

CN            102403890 A      4/2012

*Primary Examiner* — Jeffrey A Gblende
(74) *Attorney, Agent, or Firm* — Maier & Maier, PLLC

(57) ABSTRACT

A control circuit for a switch-mode power supply, a power circuit, and an electronic device. The control circuit outputs a control signal to control a switching frequency of the switch-mode power supply. The control circuit adjusts, in a plurality of cycles, a frequency of the control signal based on a plurality of ranges, and controls, in each cycle, the frequency of the control signal to change with time in a range corresponding to each cycle. In the embodiments, a frequency-domain energy dispersion degree of the control signal output by the control circuit can be increased, electromagnetic interference generated by the control signal output by the control circuit is reduced, and finally, it is ensured that the power circuit and the electronic device including the power circuit can pass a related security test.

19 Claims, 10 Drawing Sheets

(58) Field of Classification Search
CPC .......... H02M 5/293; H02M 7/12; H02M 3/10;
H02M 3/125; H02M 3/13; H02M 3/135;
H02M 3/145; H02M 3/15; H02M 3/155;
H02M 3/156; H02M 3/157; H02M 3/158;
H02M 1/346; H02M 3/1588; H02M
2003/1566; H02M 3/1582; H02M 3/1584;
H02M 2003/1557; H02M 1/0032; H02M
1/4225; H02M 7/217; H02M 1/0025;
H02M 1/0045; H02M 1/0009; H02M
1/08; H02M 1/088; H02M 1/0048; H05B
39/048; B23K 11/24; H04B 2215/069
See application file for complete search history.

(56) References Cited

U.S. PATENT DOCUMENTS

| | | | |
|---|---|---|---|
| 11,206,014 B1 | 12/2021 | Ng et al. | |
| 2004/0090802 A1* | 5/2004 | Pourseyed | H02M 1/44 |
| | | | 363/39 |
| 2018/0109176 A1* | 4/2018 | Harder | H02M 3/155 |
| 2020/0373835 A1 | 11/2020 | Lee et al. | |
| 2023/0223855 A1* | 7/2023 | Wang | H02M 3/33571 |
| | | | 363/16 |

* cited by examiner

CONTROL CIRCUIT FOR SWITCH-MODE POWER SUPPLY, POWER CIRCUIT, AND ELECTRONIC DEVICE

CROSS-REFERENCE TO RELATED APPLICATION

This application claims priority to Chinese Patent Application No. 202210911622.4, filed on Jul. 25, 2022, which is hereby incorporated by reference in its entirety.

TECHNICAL FIELD

The embodiments relate to the field of power supply technologies and to a control circuit for a switch-mode power supply, a power circuit, and an electronic device.

BACKGROUND

In the conventional technology, a power circuit usually includes a switch-mode power supply and a control circuit. The switch-mode power supply is configured to receive an input voltage, and provide an output voltage. The control circuit may be configured to send a control signal to the switch-mode power supply. The control signal is for controlling a switching frequency of a switch circuit. If a control signal sent by the control circuit to a switching device is a periodic signal with a fixed cycle, frequency-domain energy of the control signal is concentrated. Some control circuits send control signals after linear spectrum spreading or other processing to the switch-mode power supply, to reduce a maximum value of the frequency-domain energy of the control signal to enable the control signal to pass a related security test. Alternatively, the frequency-domain energy of the control signal is dispersed, and a maximum value of an energy value is reduced.

However, in the conventional technology, the control signal sent by the control circuit to the switch-mode power supply has a low frequency-domain energy dispersion degree. When the frequency-domain energy of the control signal is high, the maximum value of the energy value is still large. As a result, power circuits including these control circuits cannot pass the related security test.

SUMMARY

The embodiments provide a control circuit for a switch-mode power supply, a power circuit, and an electronic device, to resolve a problem in a conventional technology that a control signal sent by a control circuit to a switch-mode power supply has a low frequency-domain energy dispersion degree.

A first aspect of the embodiments provides a control circuit for a switch-mode power supply. The control circuit outputs a control signal to control a switching frequency of the switch-mode power supply. The control circuit adjusts, in a plurality of cycles, a frequency of the control signal based on a plurality of ranges, and controls, in each cycle, the frequency of the control signal to change with time in a range corresponding to each cycle. In the embodiments, a frequency-domain energy dispersion degree of the control signal output by the control circuit can be increased, electromagnetic interference generated by the control signal output by the control circuit is reduced, and finally, it is ensured that a power circuit and an electronic device including the power circuit pass a related security test.

In an embodiment of the first aspect, at least one of duration of at least one of the plurality of cycles of the control signal and an amplitude of at least one of the plurality of ranges is random. When the duration and/or the range of the control signal output by the control circuit change/changes randomly, uncertainty of changing of the control signal output by the control circuit can be increased, periodicity of the control signal is further weakened, and the frequency-domain energy dispersion degree of the control signal is further improved. Even when frequency-domain energy of the control signal is high, a spectrum energy value of the control signal output by the control circuit can be maximally reduced.

In an embodiment of the first aspect, the control circuit is configured to adjust the duration of the at least one of the plurality of cycles, so that the duration of the at least one cycle is greater than or less than that of a previous cycle. In this embodiment, because the control signal does not change based on a fixed cycle, and periodic change duration of the frequency of the control signal is random, the periodicity of the control signal is greatly eliminated. Therefore, a spectrum of spectrum energy on a corresponding discrete frequency is spread to a large extent. In this way, the spectrum energy value of the control signal can be further reduced.

In an embodiment of the first aspect, the control circuit is configured to randomly adjust the duration of the at least one of the plurality of cycles. In this embodiment, the periodic change duration of the frequency of the control signal may be random, so that the periodicity of the control signal is greatly eliminated, and the spectrum energy value of the control signal can be further reduced. In addition, the duration of the cycle is determined simply and directly, so that the control circuit can more effectively generate the control signal.

In an embodiment of the first aspect, the control circuit is configured to adjust the duration of the at least one cycle based on a random number corresponding to the at least one cycle and duration of a reference cycle. In this embodiment, the periodic change duration of the frequency of the control signal may be random, so that the periodicity of the control signal is greatly eliminated, and the spectrum energy value of the control signal can be further reduced. In addition, the control circuit obtains the duration of the cycle based on the reference cycle and the random number, so that changing of the duration of the cycle can be restricted more effectively.

In an embodiment of the first aspect, the control circuit is configured to adjust the amplitude of the at least one of the plurality of ranges, and the amplitude of the at least one range is less than or greater than that of a previous range. In this embodiment, the control signal output by the control circuit does not change based on a fixed cycle, and an amplitude of a frequency change range of the control signal in each cycle is random, so that the periodicity of the control signal is greatly eliminated. Therefore, a spectrum of spectrum energy on a corresponding discrete frequency is spread to a large extent. In this way, the spectrum energy value of the control signal can be further reduced.

In an embodiment of the first aspect, the control circuit is configured to adjust the amplitude of the at least one range based on a random number corresponding to the at least one cycle and a reference range. The control circuit is configured to: adjust the amplitude of the at least one range to be greater than 90% of an amplitude of the reference range and less than the amplitude of the reference range, or adjust the amplitude of the at least one range to be greater than an amplitude of the reference range and less than 110% of the amplitude of the reference range. In this embodiment, the amplitude of the frequency change range of the control signal output by the control circuit in each cycle is random, so that the spectrum energy value of the control signal can be further reduced. In addition, the control circuit obtains the duration of the cycle based on the reference cycle and the random number, so that changing of the amplitude of the change range in the cycle can be restricted more effectively.

A second aspect of the embodiments provides a power circuit, including a switch-mode power supply and a control circuit. The switch-mode power supply includes at least one switching device. The control circuit is configured to output a control signal to control a switching frequency of the switching device. The switching frequency of the switching device changes in a plurality of cycles based on a plurality of ranges. In each cycle, the switching frequency of the switching device changes with time in a range corresponding to each cycle. When the control circuit provided in the embodiments controls the switching frequency of the switching device, a frequency-domain energy dispersion degree of the control signal output by the control circuit is controlled, so that electromagnetic interference generated by the control signal output by the control circuit is reduced, and finally, it is ensured that the power circuit and an electronic device including the power circuit can pass a related security test.

In an embodiment of the second aspect, the control circuit includes a clock source and a modulator. The clock source is configured to generate a clock signal. The modulator is configured to generate the control signal after modulating the clock signal in the plurality of cycles based on the plurality of ranges. The control circuit provided in this embodiment can generate the clock signal, and perform modulation to obtain the control signal, so that control functions are enriched.

In an embodiment of the second aspect, at least one of duration of at least one of the plurality of cycles of the control signal and an amplitude of at least one of the plurality of ranges is random. When the duration and/or the range of the control signal output by the control circuit change/changes randomly, uncertainty of changing of the control signal output by the control circuit can be increased, periodicity of the control signal is further weakened, and the frequency-domain energy dispersion degree of the control signal is further improved. Even when frequency-domain energy of the control signal is high, a spectrum energy value of the control signal output by the control circuit can be maximally reduced.

In an embodiment of the second aspect, the duration of the at least one of the plurality of cycles in the switching frequency of the switching device is greater than or less than that of a previous cycle. In this embodiment, because the control signal for controlling the switching device does not change based on a fixed cycle, and periodic change duration of a frequency of the control signal is random, the periodicity of the control signal is greatly eliminated. Therefore, a spectrum of spectrum energy on a corresponding discrete frequency is spread to a large extent. In this way, the spectrum energy value of the control signal can be further reduced.

In an embodiment of the second aspect, an amplitude at which the switching frequency of the switching device changes with time in the at least one of the plurality of cycles is less than or greater than an amplitude at which the switching frequency of the switching device changes with time in the previous cycle. In this embodiment, the control signal for controlling the switching device does not change based on a fixed cycle, and an amplitude of a frequency change range of the control signal in each cycle is random, so that the periodicity of the control signal is greatly eliminated. Therefore, a spectrum of spectrum energy on a corresponding discrete frequency is spread to a large extent. In this way, the spectrum energy value of the control signal can be further reduced.

In an embodiment of the second aspect, the switch-mode power supply includes one of a boost circuit, a buck circuit, or a buck-boost circuit. This embodiment can be used in a switch-mode power supply with a non-isolation function, so that application scenarios of this embodiment are enriched.

In an embodiment of the second aspect, the switch-mode power supply includes one of an asymmetrical half-bridge flyback conversion circuit or an active clamp flyback conversion circuit. This embodiment can be used in a switch-mode power supply with an isolation function, so that application scenarios of this embodiment are enriched.

A third aspect of the embodiments provides an electronic device, including the control circuit according to any embodiment of the first aspect of the embodiments, or the power circuit according to any embodiment of the second aspect.

BRIEF DESCRIPTION OF DRAWINGS

To describe the solutions in embodiments or in the conventional technology more clearly, the following briefly describes the accompanying drawings used in describing embodiments or the conventional technology. It is clear that the accompanying drawings in the following description show some embodiments, and a person of ordinary skill in the art may still derive other drawings from these accompanying drawings without creative efforts.

DETAILED DESCRIPTION OF EMBODIMENTS

The following clearly describes the solutions in the embodiments with reference to the accompanying drawings. The described embodiments are merely some, but not all, possible embodiments. All other embodiments obtained by a person of ordinary skill in the art based on the embodiments without creative efforts shall fall within the scope of the embodiments.

In the embodiments and accompanying drawings, the terms "first", "second", "third", "fourth", and the like (if existing) are intended to distinguish between similar objects, but do not necessarily indicate a specific order or sequence. It should be understood that the data termed in such a way are interchangeable in proper circumstances so that embodiments described herein can be implemented in orders except the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

The connection relationship described in the embodiments refers to a direct or indirect connection. For example, that A is connected to B may not only be that A is directly connected to B, but also be that A is indirectly connected to B by using one or more other electrical components. For example, it may be that A is directly connected to C, and C is directly connected to B. In this way, A is connected to B by using C. It may be further understood that "A is connected to B" described in the embodiments may be that A is directly connected to B, or may be that A is indirectly connected to B by using one or more other electrical components.

Figure 1:
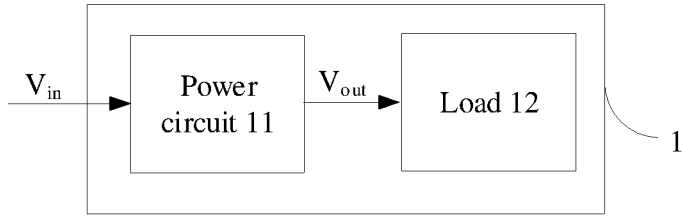
FIG. 1 is a schematic diagram of a structure of an electronic device according to an embodiment.

FIG. 1 is a schematic diagram of a structure of an electronic device according to an embodiment. As shown in FIG. 1, the electronic device 1 includes a power circuit 11 and a load 12. The power circuit 11 is configured to receive an input voltage $V_{in}$, and provide an output voltage $V_{out}$ to supply power to the load 12. In an embodiment, the input voltage $V_{in}$ may be provided by an external power supply, or may be provided by an internal power supply of the electronic device 1.

The electronic device 1 provided in the embodiment shown in FIG. 1 may be an electric device such as a mobile phone, a notebook computer, a computer chassis, an electric vehicle, a smart speaker, a smartwatch, or a wearable device. The power circuit provided in this embodiment may be used in the electronic device 1 shown in FIG. 1.

Figure 2:
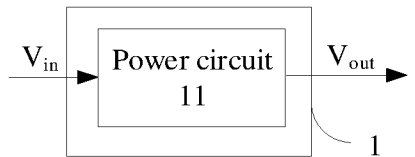
FIG. 2 is a schematic diagram of a structure of an electronic device according to an embodiment.

FIG. 2 is a schematic diagram of a structure of an electronic device according to an embodiment. As shown in FIG. 2, the electronic device 1 includes a power circuit 11. The power circuit 11 is configured to receive an input voltage $V_{in}$, and provide an output voltage $V_{out}$ to supply power to a load subsequently connected to the electronic device 1. In an embodiment, the input voltage $V_{in}$ may be provided by an external power supply, or may be provided by an internal power supply of the electronic device 1.

The electronic device 1 provided in the embodiment shown in FIG. 2 may be a power supply device such as a power adapter, a charger, or a mobile power supply. The power circuit provided in this embodiment may be used in the electronic device 1 shown in FIG. 2.

In an embodiment, the electronic device 1 may further include a plurality of power circuits 11, and the plurality of power circuits 11 provide the output voltage $V_{out}$ to supply power to the load 12. In an embodiment, the electronic device 1 may include a plurality of loads 12, and the power circuit 11 provides a plurality of output voltages $V_{out}$ to supply power to the plurality of loads 12. In an embodiment, the electronic device 1 may include a plurality of power circuits 11 and a plurality of loads 12, and the plurality of power circuits 11 provide a plurality of output voltages $V_{out}$ to supply power to the plurality of loads 12.

In an embodiment, the input voltage $V_{in}$ may be an alternating current, and the internal power supply or the power circuit 11 may include an alternating current-direct current conversion circuit. In this embodiment, the input voltage $V_{in}$ may be a direct current, the internal power supply may include an energy storage apparatus, and the power circuit 11 may include a switch-mode power supply. Correspondingly, when the electronic device 1 works independently, the energy storage apparatus of the internal power supply may supply power to the power circuit 11.

In an embodiment, the input voltage $V_{in}$ may be a direct current. The load 12 of the electronic device 1 may include one or more of an electric apparatus, an energy storage apparatus, or an external device. In an embodiment, the load 12 may be an electric apparatus of the electronic device 1, for example, a processor or a display. In an embodiment, the load 12 may be an energy storage apparatus of the electronic device 1, for example, a battery. In an embodiment, the load 12 may be an external device of the electronic device 1, for example, another electronic device such as a display or a keyboard.

Figure 3:
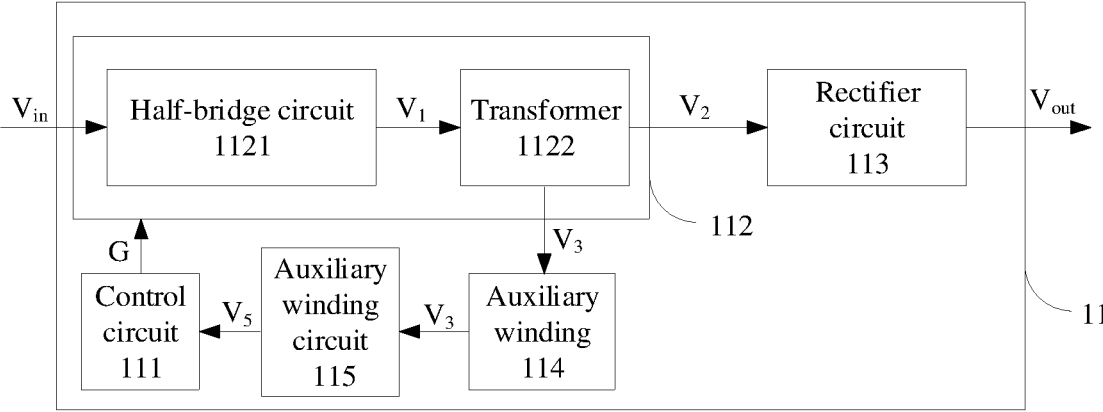
FIG. 3 is a schematic diagram of a structure of a power circuit according to an embodiment.

FIG. 3 is a schematic diagram of a structure of a power circuit according to an embodiment. As shown in FIG. 3, a power circuit 11 with an isolation function is used as an example. An input end and an output end of the power circuit 11 may be connected through a transformer. The power circuit 11 includes a control circuit 111, a switch-mode power supply 112, and a rectifier circuit 113. The switch-mode power supply 112 is configured to receive an input voltage $V_{in}$ provided by an input power supply, and provide an output voltage $V_2$. The rectifier circuit 113 is configured to provide an output voltage $V_{out}$ after rectifying the output voltage $V_2$ provided by the switch-mode power supply 112. The control circuit 111 is configured to output a control signal to control the switch-mode power supply 112.

In an embodiment, the switch-mode power supply 112 includes one of an asymmetrical half-bridge (AHB) flyback conversion circuit or an active clamp flyback (ACF) conversion circuit. For example, the asymmetrical half-bridge flyback conversion circuit includes a half-bridge circuit 1121 and a transformer 1122. The transformer 1222 includes a primary-side winding and a secondary-side winding. The half-bridge circuit 1121 includes at least one switching device. For example, the half-bridge circuit 1121 includes a primary power transistor and an auxiliary power transistor. The half-bridge circuit 1121 may further include a resonant capacitor and the like.

The control circuit 111 is connected to the switch-mode power supply 112. The control circuit 111 is configured to output the control signal to control the switch-mode power supply 112. The control circuit provided in this embodiment may include a pulse width modulation (PWM) controller, a central processing unit (CPU), another general-purpose processor, a digital signal processor (DSP), an application-specific integrated circuit (ASIC), a field programmable gate array (FPGA) or another programmable logic device, a discrete gate, a transistor logic device, or the like.

The control signal output by the control circuit 111 may be used to control turn-on and turn-off of the switching device in the half-bridge circuit 1121. When the switching device in the half-bridge circuit 1121 is cyclically turned on and off, the switch-mode power supply 112 may be configured to provide the output voltage $V_2$. In an embodiment, the control circuit 111 may send the control signal to the switching device, so that the switching device is cyclically turned on and off based on a frequency of the control signal. In an embodiment, a switching frequency of the switching device in the switch-mode power supply 112 is equal to the frequency of the control signal.

In the switch-mode power supply 112 shown in FIG. 3, the transformer 1122 includes the primary-side winding and the secondary-side winding. The half-bridge circuit 1121 is configured to receive the input voltage $V_{in}$, and provide a primary-side winding voltage $V_1$ to the primary-side winding of the transformer 1122. The primary-side winding voltage $V_1$ on the primary-side winding is coupled to the secondary-side winding to generate a secondary-side winding voltage $V_2$ on the secondary-side winding. After the secondary-side winding voltage $V_2$ is rectified by the rectifier circuit 113, an output voltage $V_{out}$ provided by the rectifier circuit 113 is an output voltage of the switch-mode power supply 112.

In this embodiment, the input voltage $V_{in}$ of the switch-mode power supply 112 is a direct current, and the output voltage $V_2$ of the switch-mode power supply 112 is also a direct current. In this embodiment, the primary-side winding is a winding that is placed at a primary side of the transformer 1122 and that corresponds to an input end (input voltage $V_{in}$) of the switch-mode power supply 112. The secondary-side winding is a winding that is placed at a secondary side of the transformer 1122 and that corresponds to an output end (output voltage $V_{out}$) of the switch-mode power supply 112.

In an embodiment, the power circuit 11 shown in FIG. 3 further includes an auxiliary winding 114 and an auxiliary winding circuit 115. The auxiliary winding 114 is coupled to the primary-side winding of the transformer 1122. The primary-side winding voltage $V_1$ on the primary-side winding is coupled to the auxiliary winding to generate an auxiliary winding voltage $V_3$ on the auxiliary winding. The auxiliary winding circuit 113 is configured to receive the voltage $V_3$ provided by the auxiliary winding 114, and provide a voltage $V_5$ for the control circuit 111. In other words, the auxiliary winding 114 provides a voltage $V_4$ through the auxiliary winding circuit 115 to supply power to the control circuit 111. In this embodiment, the auxiliary winding circuit 115 may include a switching transistor and a capacitor. For example, the auxiliary winding circuit 115 may be a voltage regulator circuit or the like.

Figure 4:
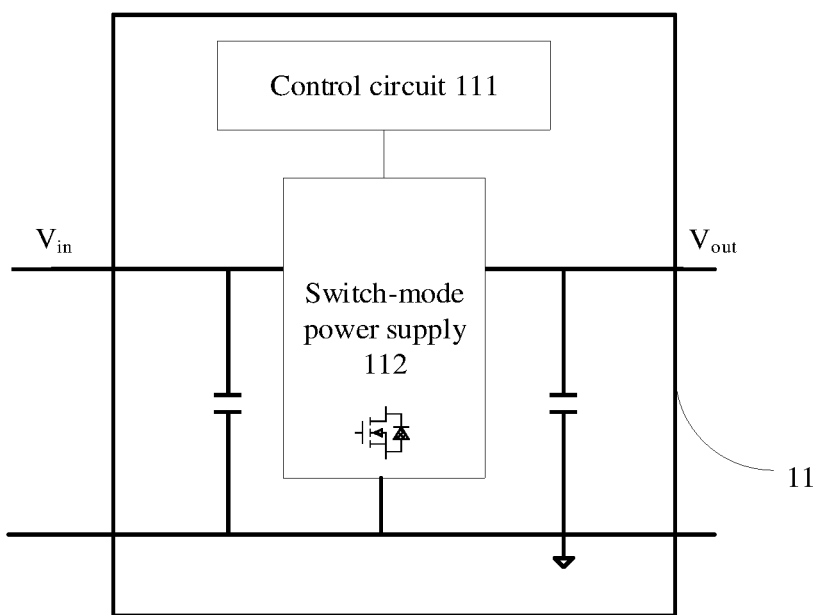
FIG. 4 is a schematic diagram of a structure of a power circuit according to an embodiment.

FIG. 4 is a schematic diagram of a structure of a power circuit according to an embodiment. As shown in FIG. 4, a power circuit 11 with a non-isolation function is used as an example. The power circuit 11 includes a control circuit 111 and a switch-mode power supply 112. The switch-mode power supply 112 may be a DC-DC conversion circuit. The switch-mode power supply 112 may be configured to receive an input voltage $V_{in}$, and provide an output voltage $V_{out}$ after performing voltage conversion processing on the input voltage $V_{in}$. The control circuit 111 is connected to the switch-mode power supply 112, and may be configured to control turn-on and turn-off of a switching device in the switch-mode power supply 112, so that the switch-mode power supply 112 provides the output voltage $V_{out}$. In an embodiment, the control circuit 111 may send a control signal to the switching device, so that the switching device is cyclically turned on and off based on a frequency of the control signal. In an embodiment, a switching frequency of the switching device in the switch-mode power supply 112 is equal to the frequency of the control signal.

Figure 5:
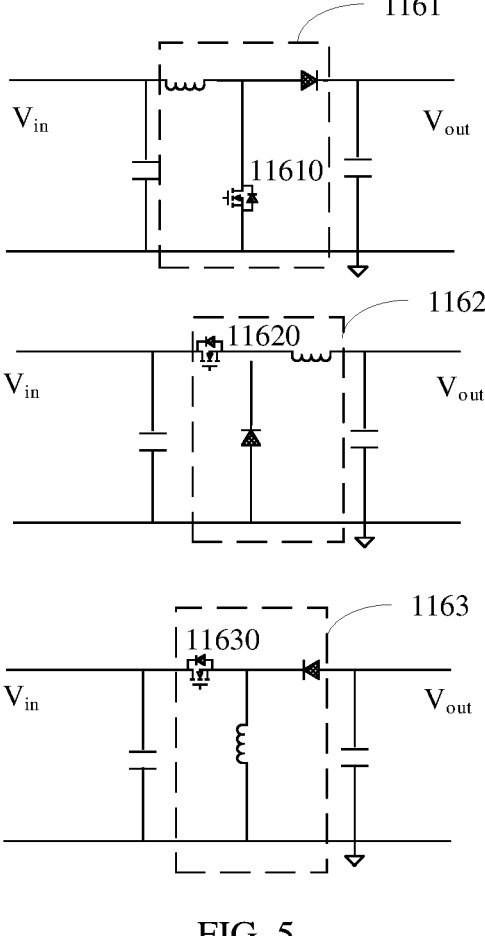
FIG. 5 is a schematic diagram of a structure of a power circuit according to an embodiment.

FIG. 5 is a schematic diagram of a structure of a power circuit according to an embodiment. As shown in this figure, the switch-mode power supply 112 in FIG. 4 may be one of a boost circuit 1161, a buck circuit 1162, or a buck-boost circuit 1163. The boost circuit 1161, the buck circuit 1162, and the buck-boost circuit 1163 each include at least one switching device, for example, a switching transistor 11610 in the boost circuit 1161, a switching transistor 11620 in the buck circuit 1162, and a switching transistor 11630 in the buck-boost circuit 1163.

In the embodiments, each of the primary power transistor, the auxiliary power transistor, and the switching transistor may be a diode, a triode, a metal-oxide semiconductor field-effect transistor (MOSFET), an insulated gate bipolar transistor (IGBT), a bipolar power transistor-, a wide band-gap semiconductor field-effect transistor, or the like.

In the embodiments, the primary power transistor, the auxiliary power transistor, and the switching transistor may be different types of transistors. For example, the primary power transistor is a MOSFET, the auxiliary power transistor is an IGBT, and the switching transistor is a wide band-gap semiconductor field-effect transistor. Alternatively, the primary power transistor, the auxiliary power transistor, and the switching transistor may be transistors of a same type. For example, the primary power transistor, the auxiliary power transistor, and the switching transistor are all MOSFETs. It may be understood that in the embodiments, only an example in which the primary power transistor, the auxiliary power transistor, and the switching transistor are MOSFETs is used for description. However, transistor types of the primary power transistor, the auxiliary power transistor, and the switching transistor are not limited in the embodiments.

In the embodiments, the primary power transistor, the auxiliary power transistor, and the switching transistor are driven in a high-level turn-on and low-level turn-off manner. For example, the primary power transistor receives a high-level drive signal, and the primary power transistor is turned on. The primary power transistor receives a low-level drive signal, and the primary power transistor is turned off. It may be understood that in the embodiments, the primary power transistor, the auxiliary power transistor, and the switching transistor may alternatively be driven in another manner. A driving manner of the primary power transistor, the auxiliary power transistor, and the switching transistor is not limited in the embodiments.

Figure 6:
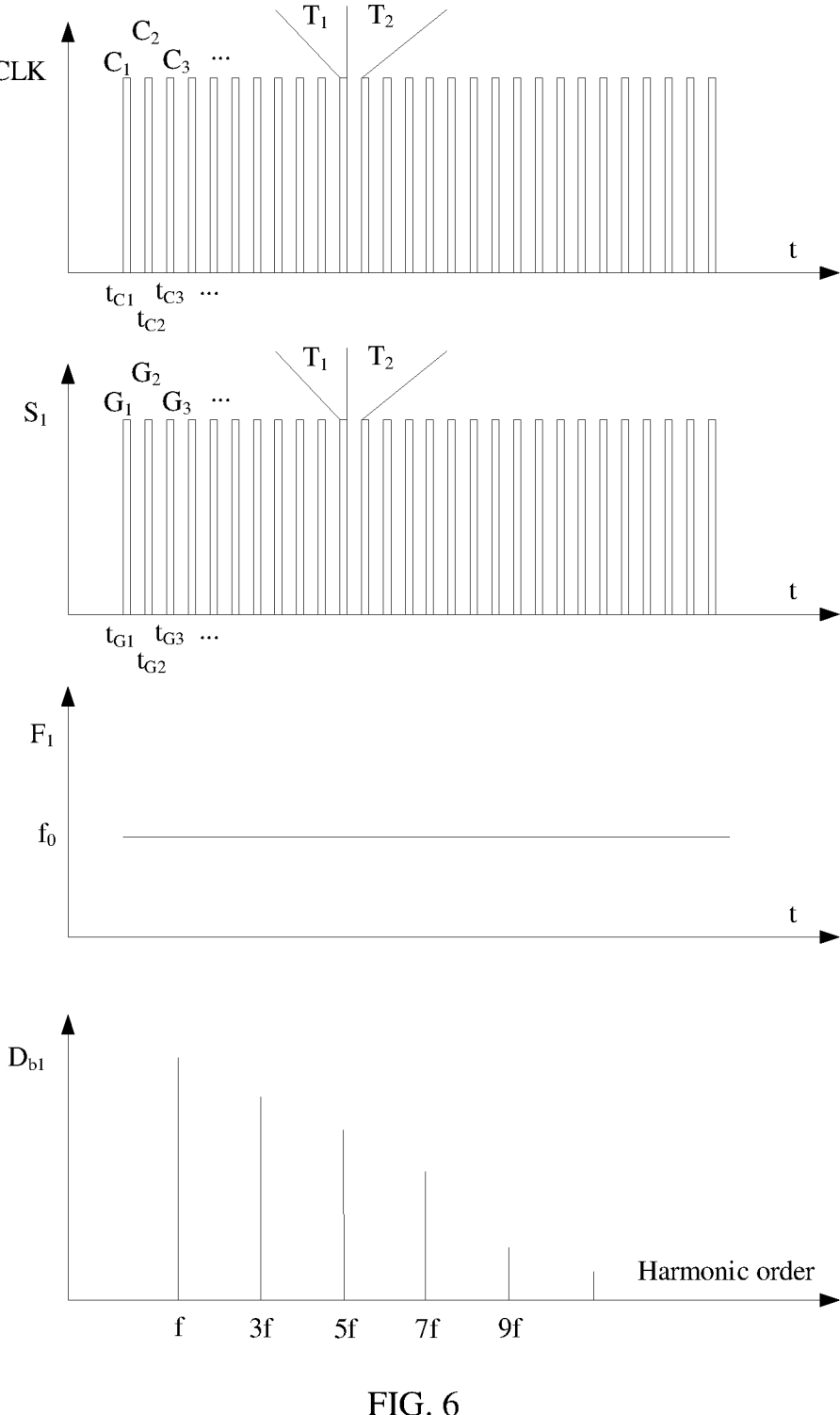
FIG. 6 is a schematic diagram of a waveform of a control signal sent by a control circuit according to a conventional technology.

FIG. 6 is a schematic diagram of a waveform of a control signal sent by a control circuit according to a conventional technology. The control circuit 111 provided in FIG. 6 may be used in the power circuit 11 in any one of FIG. 1 to FIG. 5. The control circuit 111 may be configured to send the control signal to any switching device in a switch-mode power supply 112. For example, the switching device may be a primary power transistor, an auxiliary power transistor, or a switching transistor.

As shown in FIG. 6, the control circuit 111 may generate a clock signal CLK. The clock signal CLK may be a pulse signal in a high/low-level form. Duration in which each clock signal CLK is a high-level signal is recorded as first duration $T_1$. Duration in which each clock signal CLK is a low-level signal is recorded as second duration $T_2$. Alternatively, after each clock signal CLK remains a high-level signal for first duration $T_1$, time in which the control signal is not sent is second duration $T_2$. For example, clock signals CLK are denoted as $C_1$, $C_2$, $C_3$ . . . in sequence. After sending the control signal $C_1$ to the switching device for the first duration $T_1$ from a moment $t_{C1}$, the control circuit 111 does not send the control signal $C_1$ for the second duration $T_2$. Then, after the control signal $C_2$ is sent to the switching device for the first duration $T_1$ from a moment $t_{C2}$, the control signal $C_2$ is not sent for the second duration $T_2$. The rest may be deduced by analogy. A cycle of the clock signal CLK is $(T_1+T_2)$. A frequency of the clock signal CLK is $1/(T_1+T_2)$.

Then, the clock signal CLK is used as a time-domain waveform $S_1$ of a control signal $G_{10}$ sent to the switching device. The control circuit 111 may send control signals $G_{10}$ to the switching device, and the control signals $G_{10}$ are denoted as $G_1$, $G_2$, $G_3$ ... in sequence. A cycle of the control signal $G_{10}$ is $(T_1+T_2)$. A frequency of the control signal $G_{10}$ is $1/(T_1+T_2)$. The switching device is cyclically turned on and off based on the received control signal $G_{10}$. The switching device is turned on based on a high-level signal of the control signal, and is turned off based on a low-level signal of the control signal. Therefore, a switching frequency of the switching device is equal to the frequency of the control signal $G_{10}$. A switching cycle of the switching device is $(T_1+T_2)$. The switching frequency of the switching device is $1/(T_1+T_2)$.

In the conventional technology shown in FIG. 6, the cycle of the control signal $G_{10}$ is $T_1+T_2$, and is fixed. As shown by the time-domain waveform $S_1$ of the control signal $G_{10}$ in FIG. 6, differences between a moment at which the control circuit 111 sends a high-level signal in each cycle and moments at which the control circuit 111 sends previous and next high-level signals are the same. For example, a difference between a moment $t_{G2}$ and a moment $t_{G1}$ is the same as that between the moment $t_{G2}$ and a moment $t_{G3}$. In addition, the duration $T_1$ of each high-level signal in the control signal $G_{10}$ and the second duration $T_2$ after sending of the high-level signal is stopped are the same.

Because the cycle of the control signal $G_{10}$ in time domain is fixed, the frequency of the control signal Gin frequency domain is also fixed. As shown by a frequency-domain waveform $F_1$ of the control signal $G_{10}$ in FIG. 6, the frequency of the control signal $G_{10}$ remains $f_0$, and does not change with time t. In the embodiments, values of cycles $T_0$ and frequencies $f_0$ of the clock signal and each control signal are not limited, and may be set based on the control circuit 111 and the switching device.

After the time-domain waveform $S_1$ of the control signal $G_{10}$ is expanded in frequency domain through Fourier transform, a spectrum $D_{b1}$ of the control signal G may be obtained. As shown in FIG. 6, the control signal $G_{10}$ changes periodically in time domain, so that the spectrum of the control signal $G_{10}$ is presented in a discrete form. For a fundamental frequency f obtained after Fourier transform is performed on the control signal $G_{10}$, the control signal $G_{10}$ has energy on frequencies corresponding to harmonic orders such as f, 3f, 5f, 7f, and 9f. In addition, as the harmonic order increases, energy on the frequency decreases gradually.

However, the control signal $G_{10}$ is a periodic signal with the discrete spectrum, and energy on the entire spectrum is concentrated on a limited quantity of frequencies, to form a plurality of narrowband spectrums. Therefore, when a spectrum energy value of the control signal $G_{10}$ is large, the control signal $G_{10}$ sent by the control circuit 111 to the switching device may cause electromagnetic interference to another signal of the switch-mode power supply 11 or the electronic device including the switch-mode power supply 11. In some applications, high spectrum energy of the control signal $G_{10}$ sent by the control circuit 111 to the switching device may also disable the power circuit 11 or the electronic device to pass tests such as conducted emission (CE) and spectrum security. The conducted emission test is used to check an electromagnetic phenomenon that an internal signal of the power circuit 11 or the electronic device including the power circuit 11 causes interference to another external device, to ensure that the produced and designed power circuit 11 and the electronic device can meet a specific electromagnetic interference limitation requirement.

Figure 7:
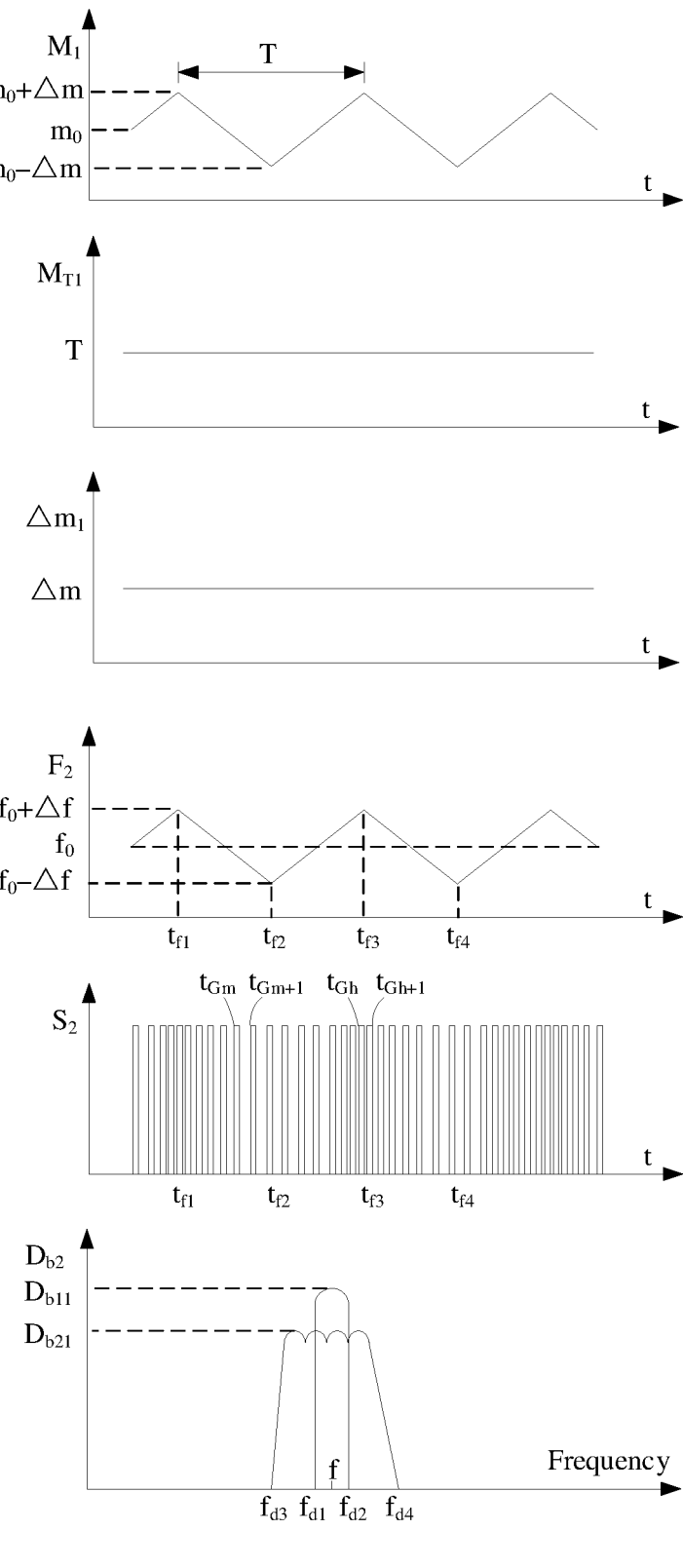
FIG. 7 is a schematic diagram of a waveform of a control signal sent by a control circuit according to a conventional technology.

FIG. 7 is a schematic diagram of a waveform of a control signal sent by a control circuit according to a conventional technology. The control circuit 111 may perform frequency modulation on the control signal, to resolve the problem in the conventional technology shown in FIG. 6 that a spectrum energy value of the control signal is large. In this way, a time-domain waveform of the control signal output by the control circuit 111 is changed, thereby reducing the spectrum energy value of the control signal.

In the embodiment shown in FIG. 7, the control circuit 111 performs frequency modulation on the clock signal CLK to obtain a control signal $G_{20}$. FIG. 7 shows a time-domain waveform $S_2$ and a frequency-domain waveform $F_2$ of the control signal $G_{20}$. It is assumed that the frequency of the clock signal CLK is the fixed frequency $f_0$. In this case, a frequency of the control signal $G_{20}$ changes periodically with the frequency $f_0$ as a center, and the frequency of the control signal $G_{20}$ changes in a certain range around the frequency $f_0$ in each cycle.

In an embodiment, the control circuit 111 may perform frequency modulation on the clock signal CLK by using a modulation waveform $M_1$ in a form of a triangular wave in time domain. As shown in FIG. 7, the modulation waveform $M_1$ changes periodically in time domain. A value of a change cycle $M_{T1}$ of the modulation waveform $M_1$ is T, and remains T unchanged. In this embodiment, when the modulation waveform $M_1$ changes in each cycle, a change range is that a maximum value is $m_0+\Delta m$ and a minimum value is $m_0-\Delta m$. The change range remains unchanged. That is, a value of a modulation depth $\Delta m_1$ of the modulation waveform $M_1$ for modulating the clock signal CLK is $\Delta m$, and remains $\Delta m$ unchanged. Because the modulation waveform $M_1$ is used to modulate the clock signal CLK, a change frequency of the modulation waveform $M_1$ may also be referred to as a modulation frequency at which the control circuit 111 modulates the clock signal CLK.

It can be understood from the frequency-domain waveform $F_2$ of the control signal $G_{20}$ obtained after modulation that, after frequency modulation is performed on the clock signal CLK by using the modulation waveform $M_1$, the frequency of the obtained control signal $G_{20}$ changes periodically, and a change form is consistent with that of the triangular wave of the modulation waveform $M_1$. For example, the frequency of the control signal $G_{20}$ reaches a maximum value $f_0+\Delta f$ at a moment $t_{f1}$, reaches a minimum value $f_0-\Delta f$ at a moment $t_{f2}$, reaches the maximum value $f_0+\Delta f$ at a moment $t_{f3}$, and reaches a minimum value $f_0-\Delta f$ at a moment $t_{f4}$. In addition, a frequency change cycle of the control signal $G_{20}$ is equal to the cycle T of the modulation waveform $M_1$, and a modulation depth $\Delta f$ is equal to the modulation depth $\Delta m$ of the modulation waveform $M_1$.

It can be understood from the time-domain waveform $S_2$ of the control signal $G_{20}$ obtained after modulation that, because the frequency of the control signal $G_{20}$ changes with time, differences between a moment at which the control circuit 111 sends a high-level signal in each cycle and moments at which the control circuit 111 sends high-level signals in previous and next cycles are different, and the difference is positively correlated with the frequency of the control signal $G_{20}$. For example, near the moment $t_{f2}$, the frequency of the control signal $G_{20}$ is less than $f_0$, so that a frequency of sending high-level signals by the control circuit 111 is low, while a cycle is long, and a difference between a moment $t_{Gm}$ and a moment $t_{Gm+1}$ is large. Near the moment $t_{f3}$, the frequency of the control signal $G_{20}$ is greater than $f_0$, so that a frequency of sending high-level signals by the control circuit 111 is high, while a cycle is short, and a difference between a moment $t_{Gh}$ and a moment $t_{Gh+1}$ is small.

After the time-domain waveform $S_2$ of the control signal $G_{20}$ is expanded in frequency domain through Fourier transform, a spectrum $D_{b2}$ of the control signal $G_{20}$ may be obtained. As shown in FIG. 7, for a fundamental frequency f obtained after Fourier transform, because the control signal $G_{20}$ does not change based on a fixed cycle, a spectrum of spectrum energy on a corresponding discrete frequency is spread. The fundamental frequency f is used as an example. After the time-domain waveform $S_1$ of the control signal $G_{10}$ is expanded in frequency domain, a spectrum width of the control signal $G_{10}$ is $f_{d1}$ to $f_{d2}$, and an energy value is $D_{b1}$. After the time-domain waveform $S_2$ of the control signal $G_{20}$ is expanded in frequency domain, a spectrum width of the control signal $G_{20}$ is $f_{d3}$ to $f_{d4}$. Because energy of the control signal G remains unchanged, when the spectrum width is larger, the energy value decreases from $D_{b11}$ to $D_{b21}$. In this way, a spectrum energy value of the control signal $G_{20}$ can be reduced to some extent.

However, because the modulation waveform $M_1$ used by the control circuit 111 to modulate the clock signal CLK changes periodically, the time-domain waveform $S_2$ of the modulated control signal $G_{20}$ also changes periodically. Therefore, in actual applications, the control signal $G_{20}$ after spectrum spreading has a low frequency-domain energy dispersion degree. However, when frequency-domain energy of the control signal $G_{20}$ is high, a reduction degree of the spectrum energy value is reduced, and consequently, the power circuit 11 or the electronic device including the power circuit 11 still cannot pass a related security test.

The control circuit 111, the power circuit 11, and the electronic device provided in the embodiments may be used to resolve a problem in the conventional technology that the power circuit or the electronic device cannot pass a security test because the control signal output by the control circuit 111 for the switch-mode power supply 112 has a low frequency-domain energy dispersion degree and a large frequency-domain energy value. Embodiments are used below to describe in detail the solutions. The following several embodiments may be combined with each other, and a same or similar concept or process may not be described repeatedly in some embodiments.

Figure 8:
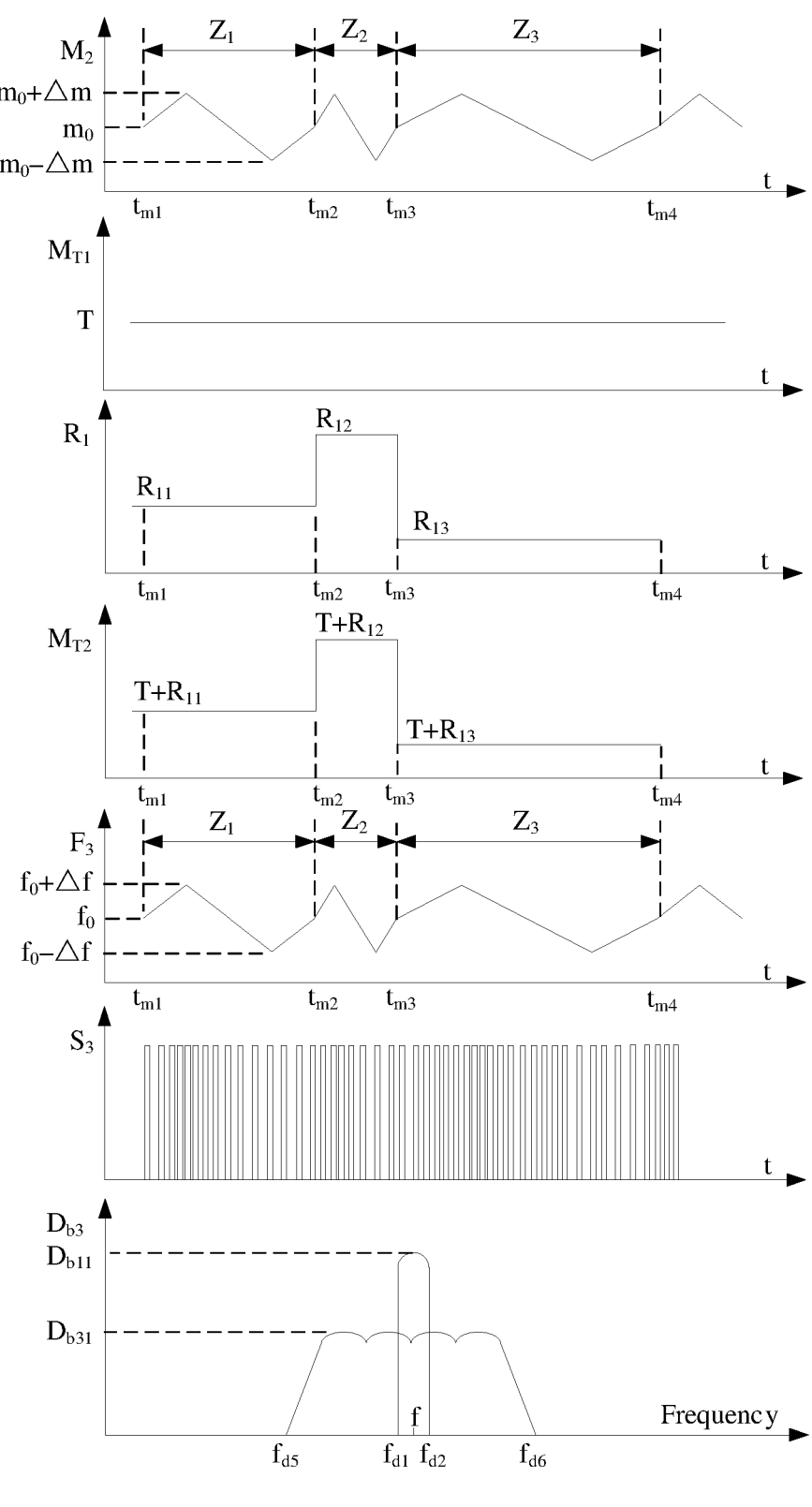
FIG. 8 is a schematic diagram of a waveform of a control signal sent by a control circuit according to an embodiment.

FIG. 8 is a schematic diagram of a waveform of a control signal sent by a control circuit according to the embodiments. In an example shown in FIG. 8, the control circuit 111 may perform frequency modulation on the clock signal CLK by using a modulation waveform $M_2$ in the form of a triangular wave in time domain, to obtain a modulated control signal $G_{30}$. The modulation waveform $M_2$ changes periodically in time domain, and a value of duration of a cycle $M_{T2}$ changes randomly. For example, duration of a cycle $Z_1$ is $t_{m2}-t_{m1}$, duration of a cycle $Z_2$ is $t_{m3}-t_{m2}$, and duration of a cycle $Z_3$ is $t_{m4}-t_{m3}$.

In an embodiment, duration of a plurality of cycles of the modulation waveform $M_2$ is different. Duration of at least one of the plurality of cycles of the modulation waveform $M_2$ is random. In an embodiment, the duration of the at least one of the plurality of cycles of the modulation waveform $M_2$ is less than or greater than that of a previous cycle.

In an embodiment, the duration of the at least one of the plurality of cycles of the modulation waveform $M_2$ may be a random number. Alternatively, in an embodiment, the duration of the at least one of the plurality of cycles of the modulation waveform $M_2$ may be obtained by using a random number. For example, the duration of the at least one cycle may be determined by a sum of duration T of a reference cycle and a first random number. Duration of a reference cycle $M_{T1}$ is T, and first random numbers $R_1$ corresponding to the plurality of cycles of the modulation waveform $M_2$ are denoted as $R_{11}$, $R_{12}$, $R_{13}$ . . . . Then, the duration of the plurality of cycles of the modulation waveform $M_2$ may be obtained by using sums of the duration T of the reference cycle $M_{T1}$ and the first random numbers $R_1$, that is, $T+R_{11}$, $T+R_{12}$, $T+R_{13}$ . . . . It can be understood that the duration $T+R_{11}$, $T+R_{12}$, $T+R_{13}$ . . . change randomly.

In an embodiment, a value of the first random number Ru may be within a preset range. In this way, the value of the first random number Ru is restricted by using the preset range. A specific value of the preset range is not limited in this embodiment, and may be set based on the control circuit 111 and the switching device. In an embodiment, a time length of a cycle of the modulation waveform $M_2$ may be far greater than that of a cycle of the control signal $G_{30}$.

The modulated control signal $G_{30}$ may be obtained by performing frequency modulation on the clock signal CLK based on the modulation waveform $M_2$. FIG. 8 shows a frequency-domain waveform $F_3$ and a time-domain waveform $S_3$ of the modulated control signal $G_{30}$. In an embodiment, because the modulation waveform $M_2$ is used to modulate the clock signal CLK to obtain the control signal $G_{30}$, a change frequency of the modulation waveform $M_2$ may also be referred to as a modulation frequency for modulating the clock signal CLK. In the embodiment shown in FIG. 8, the modulation frequency changes periodically, and a value of duration of each cycle is random.

It can be understood from the frequency-domain waveform $F_3$ of the control signal $G_{30}$ that, after frequency modulation is performed on the clock signal CLK by using the modulation waveform $M_2$, a frequency of the obtained control signal $G_{30}$ changes periodically. In addition, duration of each cycle of the control signal $G_{30}$ changes randomly. For example, a time length of the cycle $Z_1$ is $t_{m2}-t_{m1}$, a time length of the cycle $Z_2$ is $t_{m3}-t_{m2}$, and a time length of the cycle $Z_3$ is $t_{m4}-t_{m3}$. A time length of each cycle of the control signal $G_{30}$ is different, and is obtained randomly. A minimum value of a frequency change amplitude of the control signal $G_{30}$ in each cycle is $f_0-\Delta f$, and a maximum value is $f_0+\Delta f$. The amplitude in each cycle remains $\Delta f$ unchanged. $\Delta f$ is equal to a modulation depth $\Delta m$ of the modulation waveform $M_2$.

It can be understood from the time-domain waveform $S_3$ of the control signal $G_{30}$ that, because the frequency of the control signal $G_{30}$ changes with time, differences between a moment at which the control circuit 111 sends a high-level signal in each cycle and moments at which the control circuit 111 sends high-level signals are different, and the difference is positively correlated with changing of the frequency of the control signal $G_{30}$. Duration of frequency change cycles of the control signal $G_{30}$ is different. For example, between a moment $t_{m1}$ and a moment too, the frequency of the control signal $G_{30}$ increases first and then decreases, to complete changing of one cycle. Between the moment $t_{m2}$ and a moment $t_{m3}$, the frequency of the control signal $G_{30}$ increases first and then decreases, to complete changing of one cycle. Between the moment $t_{m3}$ and a moment $t_{m4}$, the frequency of the control signal $G_{30}$ increases first and then decreases, to complete changing of one cycle. It can be understood that, because the time length of the cycle $Z_2$ is small, between the moment $t_{m2}$ and the moment $t_{m3}$, the frequency of the control signal $G_{30}$ completes changing of one cycle more quickly. Because the time length of the cycle $Z_3$ is large, between the moment $t_{m3}$ and the moment $t_{m4}$, the frequency of the control signal $G_{30}$ completes changing of one cycle more slowly.

After the time-domain waveform $S_3$ of the control signal $G_{30}$ is expanded in frequency domain through Fourier transform, a spectrum $D_{b3}$ of the control signal $G_{30}$ may be obtained. As shown in FIG. 8, for a fundamental frequency f after Fourier transform, because the control signal $G_{30}$ does not change based on a fixed cycle, and periodic change duration of the frequency of the control signal $G_{30}$ is random, periodicity of the control signal $G_{30}$ is greatly eliminated. Therefore, a spectrum of spectrum energy on a corresponding discrete frequency is spread to a large extent. The fundamental frequency f is used as an example. After the time-domain waveform $S_3$ of the control signal $G_{30}$ is expanded in frequency domain, a spectrum width of the fundamental frequency f is $f_{d5}$ to $f_{d6}$. Because energy of the control signal $G_{30}$ remains unchanged, when the spectrum width is larger, an energy value decreases to $D_{b31}$. In this way, a spectrum energy value of the control signal $G_{30}$ can be further reduced.

For the control circuit 111, when the control signal is output, the frequency of the control signal $G_{30}$ may be adjusted in a plurality of cycles based on each range, so that the control signal $G_{30}$ sent by the control circuit 111 changes based on the time-domain waveform $S_3$ and the frequency-domain waveform $F_3$ shown in FIG. 8. Because frequency duration of the control signal in each cycle is different, the control circuit adjusts, in each cycle, the frequency of the control signal to change with time in a range corresponding to each cycle.

For the power circuit 11, when the control circuit 111 outputs the control signal $G_{30}$ to the switching device in the switch-mode power supply 112, the switching device in the switch-mode power supply 112 is turned on and off based on the frequency of the control signal $G_{30}$. That is, the switching frequency of the switching device is equal to the frequency of the control signal $G_{30}$. When the control circuit 111 controls, in each cycle, the frequency of the control signal to change with time in the range corresponding to each cycle, the switching frequency of the switching device also changes with time in the corresponding range in each cycle based on the frequency of the control signal.

Figure 9:
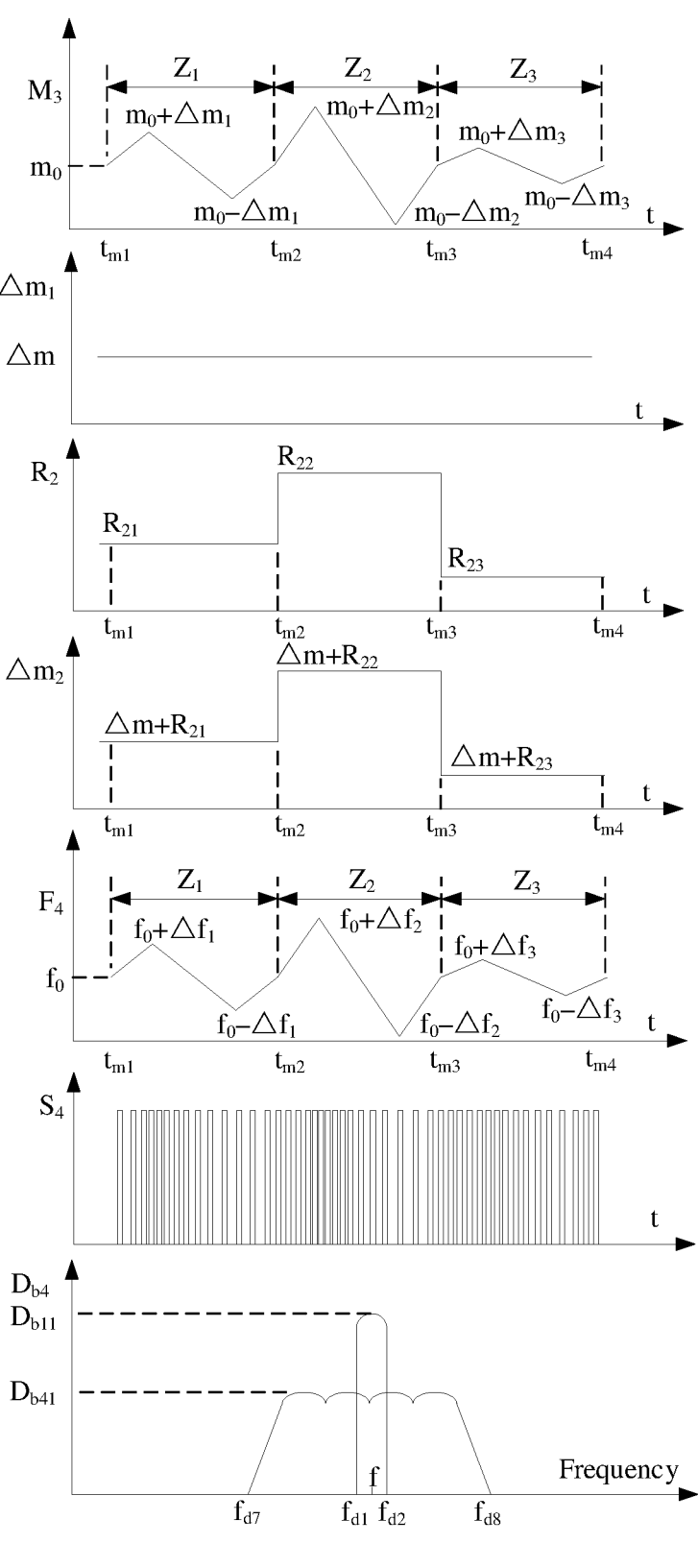
FIG. 9 is a schematic diagram of a waveform of a control signal sent by a control circuit according to an embodiment.

FIG. 9 is a schematic diagram of a waveform of a control signal sent by a control circuit according to the embodiments. In an example shown in FIG. 9, the control circuit 111 may perform frequency modulation on the clock signal CLK by using a modulation waveform $M_3$ in the form of a triangular wave in time domain, to obtain a modulated control signal $G_{40}$. The modulation waveform $M_3$ changes periodically in time domain, and duration T of each change cycle is the same. In each change cycle, an amplitude of a change range of a modulation frequency changes randomly, that is, a modulation depth in each change cycle changes randomly. For example, in a cycle $Z_1$, the frequency change range is between $m_0-\Delta m1$ and $m_0+\Delta m1$, and the modulation depth is $\Delta m1$. In a cycle $Z_2$, the frequency change range is between $m_0-\Delta m2$ and $m_0+\Delta m2$, and the modulation depth is $\Delta m2$. In a cycle $Z_3$, the frequency change range is between $m_0-\Delta m3$ and $m_0+\Delta m3$, and the modulation depth is $\Delta m3$.

In an embodiment, frequency change amplitudes with time in a plurality of cycles of the modulation waveform $M_3$ are different. A frequency change amplitude in at least one of the plurality of cycles of the modulation waveform $M_3$ is random. In an embodiment, the frequency change amplitude in the at least one of the plurality of cycles of the modulation waveform $M_3$ is greater than or equal to that in a previous cycle.

In an embodiment, a frequency change range in at least one of the plurality of cycles of the modulation waveform $M_3$ may be a random number. Alternatively, in an embodiment, a frequency change range in at least one of the plurality of cycles of the modulation waveform $M_3$ may be determined by a sum of a reference range and a second random number. For example, the reference range is $\Delta m$, and second random numbers $R_2$ corresponding to the plurality of cycles of the modulation waveform $M_3$ are denoted as $R_{21}$, $R_{22}$, $R_{23}$ .... Then, frequency change ranges in the plurality of cycles of the modulation waveform $M_3$ may be obtained by using sums of the reference range $\Delta m1$ and the second random numbers, that is, $\Delta m+R_{21}$, $\Delta m+R_{22}$, $\Delta m+R_{23}$ ....

In an embodiment, a value of the second random number $R_2$ may be within a preset range. In this way, the value of the second random number $R_2$ is restricted by using the preset range. For example, an absolute value of the second random number $R_2$ may be in [a, b]. For a maximum value b of the second random number $R_2$, a maximum frequency value of the modulation waveform $M_3$ is $\Delta m+b$, a maximum frequency of a frequency-domain waveform $F_4$ of the control signal $G_{40}$ is $f_0+\Delta m+b$, and a minimum frequency is $f_0-\Delta m-b$. The maximum frequency $f_0+\Delta m+b$ of the control signal $G_{40}$ is greater than an amplitude $f_0$ of the reference range and less than 110% of the amplitude $f_0$ of the reference range. The minimum frequency $f_0-\Delta m-b$ of the control signal $G_{40}$ is less than the amplitude $f_0$ of the reference range and greater than 90% of the amplitude $f_0$ of the reference range. In this way, a value range of the second random number is restricted, so that the frequency change range of the control signal $G_{40}$ changes in the plurality of cycles within a range of $\pm10\%$ of the amplitude $f_0$ of the reference range.

The modulated control signal $G_{40}$ may be obtained by performing frequency modulation on the clock signal CLK based on the modulation waveform $M_3$. FIG. 9 shows a time-domain waveform $S_4$ and the frequency-domain waveform $F_4$ of the modulated control signal $G_{40}$.

In an embodiment, because the modulation waveform $M_3$ is used to modulate the clock signal CLK to obtain the control signal $G_{40}$, a change frequency of the modulation waveform $M_3$ may also be referred to as the modulation frequency for modulating the clock signal CLK. In the embodiment shown in FIG. 9, the modulation frequency changes periodically, and an amplitude of the change range of the modulation frequency in each change cycle is random.

It can be understood from the frequency-domain waveform $F_4$ of the control signal $G_{40}$ that, after frequency modulation is performed on the clock signal CLK by using the modulation waveform $M_3$, a frequency of the obtained control signal $G_{40}$ changes periodically. In addition, a frequency change range in each change cycle is random. For example, a frequency change range in the cycle $Z_1$ is between $f_0-\Delta f_1$ and $f_0+\Delta f_1$, and an amplitude of the frequency change range in this cycle is $\Delta f_1$, where $\Delta f_1=\Delta m+R_{21}$. A frequency change range in the cycle $Z_2$ is between $f_0-\Delta f_2$ and $f_0+\Delta f_2$, and an amplitude of the frequency change range in this cycle is $\Delta f_2$, where $\Delta f_2=\Delta m+R_{22}$. A frequency change range in the cycle $Z_3$ is between $f_0-\Delta f_3$ and $f_0+\Delta f_3$, and an amplitude of the frequency change range in this cycle is $\Delta f_3$, where $\Delta f_3=\Delta m+R_{23}$.

It can be understood from the time-domain waveform $S_4$ of the control signal $G_{40}$ that, because the frequency of the control signal $G_{40}$ changes with time, differences between a moment at which the control circuit 111 sends a high-level signal in each cycle and moments at which the control circuit 111 sends previous and next high-level signals are different, and the difference is positively correlated with the frequency of the control signal $G_{40}$. An amplitude of the frequency change range of the control signal $G_{40}$ in each cycle is different. For example, between a moment $t_{m1}$ and a moment too, the frequency of the control signal $G_{40}$ increases first and then decreases, to complete changing of one cycle. Between the moment too and a moment $t_{m3}$, the frequency of the control signal $G_{40}$ increases first and then decreases, to complete changing of one cycle. Between the moment $t_{m3}$ and a moment $t_{m4}$, the frequency of the control signal $G_{40}$ increases first and then decreases, to complete changing of one cycle. It can be understood that, because amplitudes $(f_0-\Delta f_2$ and $f_0+\Delta f_2)$ of the frequency change range in the cycle $Z_2$ are larger, a difference of intervals between moments corresponding to high-level signals in the control signal $G_{40}$ between the moment too and the moment $t_{m3}$ changes more significantly than that in another cycle. Because amplitudes $(f_0-\Delta f_3$ and $f_0+\Delta f_3)$ of the frequency change range in the cycle $Z_3$ are smaller, a difference of intervals between moments corresponding to high-level signals in the control signal $G_{40}$ between the moment $t_{m4}$ and the moment $t_{m3}$ changes less significantly than that in another cycle.

After the time-domain waveform $S_4$ of the control signal $G_{40}$ is expanded in frequency domain through Fourier transform, a spectrum $D_{b4}$ of the control signal $G_{40}$ may be obtained. As shown in FIG. 9, for a fundamental frequency f after Fourier transform, because the control signal $G_{40}$ does not change based on a fixed cycle, and the amplitude of the frequency change range of the control signal $G_{40}$ in each cycle is random, periodicity of the control signal $G_{40}$ is greatly eliminated. Therefore, a spectrum of spectrum energy on a corresponding discrete frequency is spread to a large extent. The fundamental frequency f is used as an example. After the time-domain waveform $S_4$ of the control signal $G_{40}$ is expanded in frequency domain, a spectrum width of the control signal $G_{40}$ is $f_{d7}$ to $f_{d8}$. Because energy of the control signal $G_{40}$ remains unchanged, when the spectrum width is larger, an energy value decreases to $D_{b41}$. In this way, a spectrum energy value of the control signal $G_{40}$ can be further reduced.

For the control circuit 111, when the control signal is output, the frequency of the control signal $G_{40}$ may be adjusted in a plurality of cycles based on each range, so that the control signal $G_{40}$ sent by the control circuit 111 changes based on the time-domain waveform $S_4$ and the frequency-domain waveform $F_4$ shown in FIG. 8. Because the amplitude of the frequency change range of the control signal in each cycle is different, the control circuit adjusts, in each cycle, the frequency of the control signal to change with time in a range corresponding to each cycle.

For the power circuit 11, when the control circuit 111 outputs the control signal $G_{40}$ to the switching device in the switch-mode power supply 112, the switching device in the switch-mode power supply 112 is turned on and off based on the frequency of the control signal $G_{40}$. That is, the switching frequency of the switching device is equal to the frequency of the control signal $G_{40}$. When the control circuit 111 controls, in each cycle, the frequency of the control signal to change with time in the range corresponding to each cycle, the switching frequency of the switching device also changes with time in the corresponding range in each cycle based on the frequency of the control signal.

Figure 10:
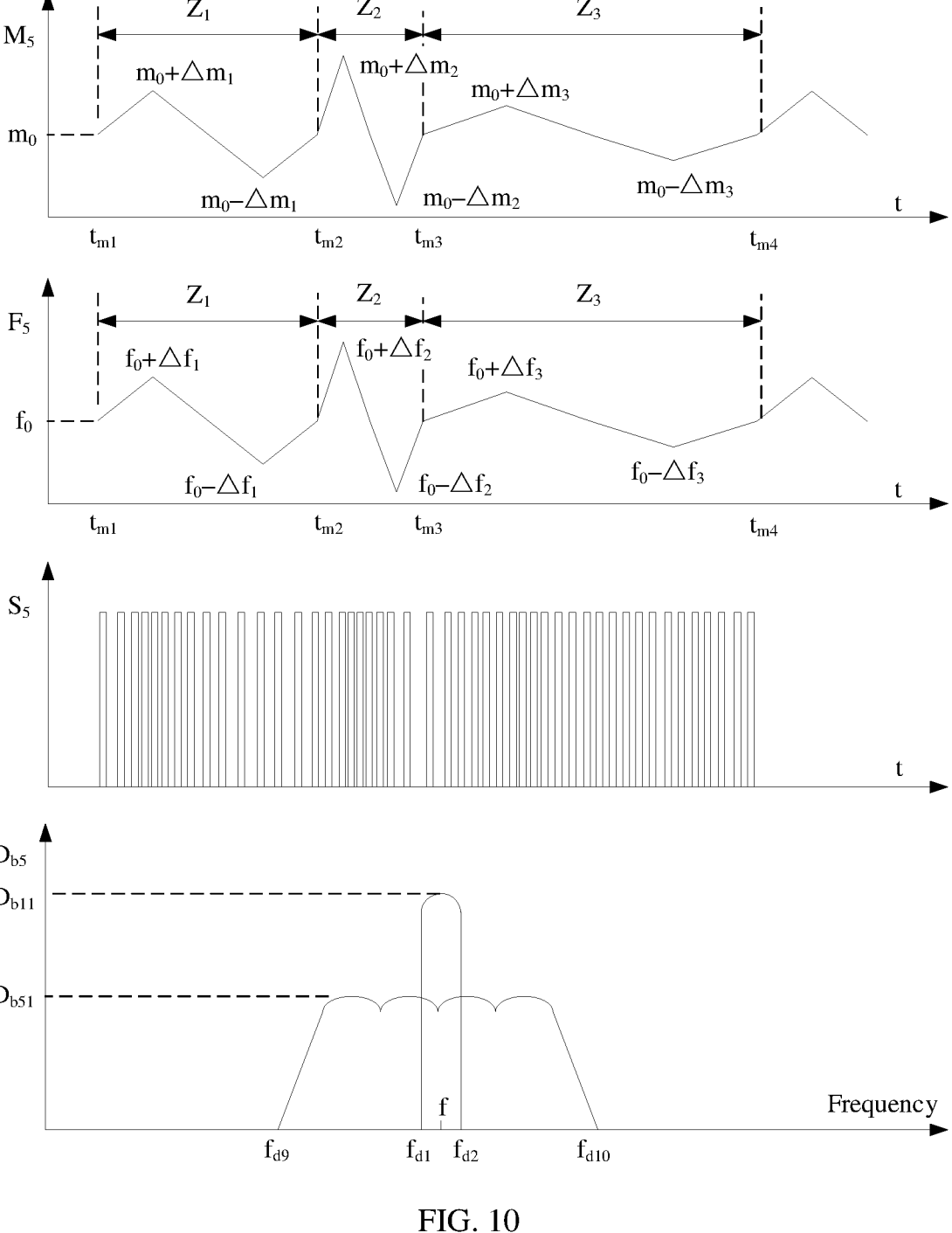
FIG. 10 is a schematic diagram of a waveform of a control signal sent by a control circuit according to an embodiment.

FIG. 10 is a schematic diagram of a waveform of a control signal sent by a control circuit according to the embodiments. In an example shown in FIG. 10, the control circuit 111 may perform frequency modulation on the clock signal CLK by using a modulation waveform M 5 in the form of a triangular wave in time domain, to obtain a modulated control signal $G_{50}$. The modulation waveform $M_5$ changes periodically in time domain, and a value of duration of each change cycle changes randomly. In each cycle, an amplitude of a change range of a modulation frequency also changes randomly, that is, a modulation depth in each change cycle changes randomly. For example, duration of a cycle $Z_1$ is $t_{m2}-t_{m1}$, a frequency change range in the cycle $Z_1$ is between $m_0-\Delta m1$ and $m_0+\Delta m1$, and a change amplitude is $\Delta m1$. Duration of a cycle $Z_2$ is $t_{m3}-t_{m2}$, a frequency change range in the cycle $Z_2$ is between $m_0-\Delta m2$ and $m_0+\Delta m2$, and a change amplitude is $\Delta m2$. Duration of a cycle $Z_3$ is $t_{m4}-t_{m3}$, a frequency change range in the cycle $Z_3$ is between $m_0-\Delta m3$ and $m_0+\Delta m3$, and a change amplitude is $\Delta m3$.

In an embodiment, duration of at least one of a plurality of cycles of the modulation waveform $M_5$ is random, and an amplitude of at least one of a plurality of ranges in the plurality of cycles is random. The duration of the at least one cycle may be determined by a sum of duration T of a reference cycle and a first random number $R_1$. The amplitude of the at least one range may be a sum of an amplitude of a reference range and a second random number $R_2$.

The modulated control signal $G_{50}$ may be obtained by performing frequency modulation on the clock signal CLK based on the modulation waveform $M_5$. FIG. 10 shows a time-domain waveform $S_5$ and a frequency-domain waveform $F_5$ of the modulated control signal $G_{50}$. In an embodiment, because the modulation waveform $M_5$ is used to modulate the clock signal CLK to obtain the control signal G, a change frequency of the modulation waveform $M_5$ may also be referred to as the modulation frequency for modulating the clock signal CLK. In the embodiment shown in FIG. 10, the modulation frequency changes periodically, and a value of duration of each cycle is random. In addition, an amplitude of a change range of the modulation frequency in each cycle is random.

It can be understood from the frequency-domain waveform $F_5$ of the control signal $G_{50}$ that, after frequency modulation is performed on the clock signal CLK by using the modulation waveform $M_5$, a frequency of the control signal $G_{50}$ changes with time. The duration of each cycle changes randomly. A time length of each cycle of the control signal $G_{50}$ is different, and is obtained randomly. In addition, a frequency change range in a frequency change cycle of the control signal $G_{50}$ is random.

It can be understood from the time-domain waveform $S_5$ of the control signal $G_{50}$ that differences between a moment at which the control circuit 111 sends a high-level signal in each cycle and moments at which the control circuit 111 sends previous and next high-level signals are different, and the difference is positively correlated with the frequency of the control signal $G_{50}$.

For example, between a moment tog and a moment $t_{m2}$, the frequency of the control signal $G_{50}$ increases first and then decreases, to complete changing of one cycle. Between the moment $t_{m2}$ and a moment $t_{m3}$, the frequency of the control signal G increases first and then decreases, to complete changing of one cycle. Between the moment $t_{m3}$ and a moment $t_{m4}$, the frequency of the control signal $G_{50}$ increases first and then decreases, to complete changing of one cycle. It can be understood that, because the duration of the cycle $Z_2$ is shorter and the amplitude of the frequency change range is larger, between the moment $t_{m2}$ and the moment $t_{m3}$, a difference of intervals between moments corresponding to high-level signals in the control signal $G_{50}$ changes more significantly than that in another cycle, and changing of one cycle is completed more quickly. Because the duration of the cycle $Z_3$ is longer and the amplitude of the frequency change range is smaller, between the moment $t_{m4}$ and the moment $t_{m3}$, a difference of intervals between moments corresponding to high-level signals in the control signal $G_{50}$ changes less significantly than that in another cycle, and changing of one cycle is completed more slowly.

After the time-domain waveform $S_5$ of the control signal $G_{50}$ is expanded in frequency domain through Fourier transform, a spectrum $D_{b5}$ of the control signal $G_{50}$ may be obtained. As shown in FIG. 10, for a fundamental frequency f after Fourier transform, because the control signal $G_{50}$ does not change based on a fixed cycle, the duration of the frequency change cycle of the control signal $G_{50}$ is random, and the amplitude of the frequency change range of the control signal $G_{50}$ in each cycle is also random, periodicity of the control signal $G_{50}$ is greatly eliminated. Therefore, a spectrum of spectrum energy on a corresponding discrete frequency is spread to a large extent. The fundamental frequency f is used as an example. After the time-domain waveform $S_3$ of the control signal G is expanded in frequency domain, a spectrum width of the control signal $G_{50}$ is $f_{d9}$ to $f_{d10}$. Because energy of the control signal $G_{50}$ remains unchanged, when the spectrum width is larger, an energy value decreases to $D_{b51}$. In this way, a spectrum energy value of the control signal $G_{50}$ can be further reduced.

For the control circuit 111, when the control signal is output, the frequency of the control signal $G_{50}$ may be adjusted in a plurality of cycles based on each range, so that the control signal $G_{50}$ sent by the control circuit 111 changes based on the time-domain waveform $S_5$ and the frequency-domain waveform $F_5$ shown in FIG. 10. The control circuit adjusts, in each cycle, the frequency of the control signal to change with time in a range corresponding to each cycle.

For the power circuit 11, when the control circuit 111 outputs the control signal $G_{50}$ to the switching device in the switch-mode power supply 112, the switching device in the switch-mode power supply 112 is turned on and off based on the frequency of the control signal $G_{50}$. That is, the switching frequency of the switching device is equal to the frequency of the control signal $G_{50}$. When the control circuit 111 controls, in each cycle, the frequency of the control signal to change with time in the range corresponding to each cycle, the switching frequency of the switching device also changes with time in the corresponding range in each cycle based on the frequency of the control signal.

In the embodiments shown in FIG. 8, FIG. 9, and FIG. 10, the control circuit for the switch-mode power supply, the power circuit, and the electronic device provided may be used in the power circuits 11 shown in FIG. 1 to FIG. 5. The control circuit 111 may be configured to output the control signal to the switching device in the switch-mode power supply 112. The switching device is cyclically turned on and off based on the control signal and at the switching frequency that changes with time. The switching frequency of the switching device is equal to the frequency of the control signal.

In an embodiment, when the switching device is cyclically turned on and off, the switch-mode power supply 112 including the switching device may receive the input voltage, and provide the output voltage. For example, in the switch-mode power supply 112 shown in FIG. 3, when the primary power transistor and the auxiliary power transistor of the half-bridge circuit 1121 are cyclically turned on and off based on the frequency of the control signal, the primary power transistor in the half-bridge circuit 1121 is turned on, and the auxiliary power transistor is turned off, the half-bridge circuit 1121 provides the output voltage $V_2$ based on the input voltage $V_{in}$. When the primary power transistor is turned off, and the auxiliary power transistor is turned on, the half-bridge circuit 1121 provides the output voltage $V_2$ based on electric energy stored in the capacitor. For another example, in the switch-mode power supply 112 shown in FIG. 5, when the switching transistor of the switch-mode power supply 112 is cyclically turned on and off based on the frequency of the control signal, the switch-mode power supply 112 is cyclically turned on and off based on the switching frequency. When the switching transistor is turned on, the switch-mode power supply 112 provides the output voltage $V_2$ based on the input voltage $V_{in}$. When the switching transistor is turned off, the switch-mode power supply 112 provides the output voltage $V_{out}$ based on electric energy stored in the capacitor.

When the control circuit 111 modulates the clock signal CLK to obtain the control signal, at least one of duration of at least one of the plurality of cycles and an amplitude of at least one of the plurality of ranges is random. Therefore, uncertainty of changing of the control signal output by the control circuit 111 is increased, the periodicity of the control signal G is further weakened, and a frequency-domain energy dispersion degree of the control signal G is further improved. Even when the frequency-domain energy of the control signal G is high, the spectrum energy value of the control signal G output by the control circuit 111 can be maximally reduced, electromagnetic interference generated by the control signal G output by the control circuit 111 is reduced, and finally, it is ensured that the power circuit 11 and the electronic device including the power circuit can pass the related security test.

Figure 11:
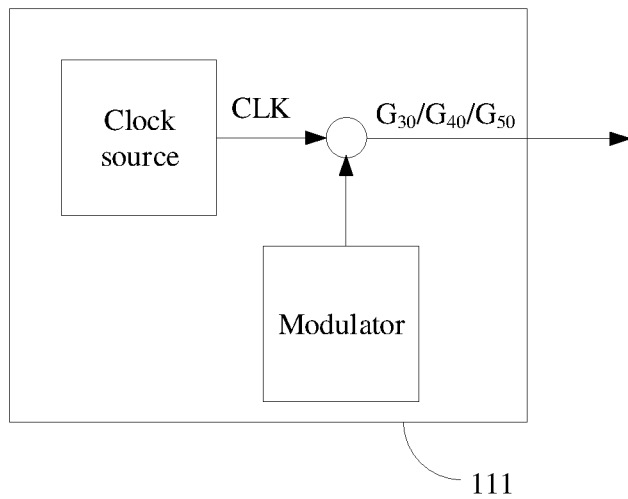
FIG. 11 is a schematic diagram of a structure of a control circuit according to and embodiment.

FIG. 11 is a schematic diagram of a structure of a control circuit according to the embodiments. A control circuit 111 shown in FIG. 11 includes a clock source and a modulator. The clock source is configured to generate a clock signal CLK. The clock signal CLK is a periodic pulse signal with a fixed cycle and frequency. For example, a time-domain waveform of the clock signal may be CLK shown in FIG. 6. The modulator is configured to obtain the clock signal CLK, and modulate the clock signal CLK in a plurality of cycles based on a plurality of ranges, to generate a control signal. The generated control signal may be one or more of control signals $G_3$, $G_4$, or $G_5$ generated in the foregoing embodiments.

In an embodiment, the clock signal CLK includes a plurality of consecutive pulse signals. After receiving one pulse signal of the clock signal CLK, the control circuit 111 may perform frequency modulation on the current pulse signal of the clock signal CLK based on a frequency corresponding to a current moment, to obtain the control signal G, and then send the modulated control signal G to a switching device. The frequency corresponding to the current moment may change with time in a form of the frequency-domain waveform $F_3$, $F_4$, or $F_5$ of the control signal in the foregoing embodiments.

For example, refer to FIG. 8. After receiving the clock signal CLK at the current moment, the control circuit 111 may determine, based on a sum of the duration T of the reference cycle and the first random number $R_{11}$ corresponding to the current moment, that duration of a modulation cycle corresponding to the current moment is $T+R_{11}$. Subsequently, the control circuit 111 determines a switching frequency F 3 at the current moment based on the time length $T+R_{11}$ of the current modulation cycle, and modulates the clock signal CLK based on the switching frequency $F_3$ at the current moment to obtain the control signal $G_3$ at the current moment.

For another example, refer to FIG. 9. After receiving the clock signal CLK at the current moment, the control circuit 111 may determine, based on a sum of the amplitude $\Delta m$ of the reference range of the switching frequency in the cycle and the second random number $R_{21}$ corresponding to the current moment, that the amplitude of the change range of the switching frequency at the current moment is $\Delta m$. The change range is $\Delta m+R_{21}$. Subsequently, the control circuit 111 determines the switching frequency $F_4$ at the current moment based on the change range $\Delta m+R_{21}$ of the switching frequency at the current moment, and modulates the clock signal CLK based on the switching frequency $F_4$ at the current moment to obtain the control signal $G_4$ at the current moment.

Figure 12:
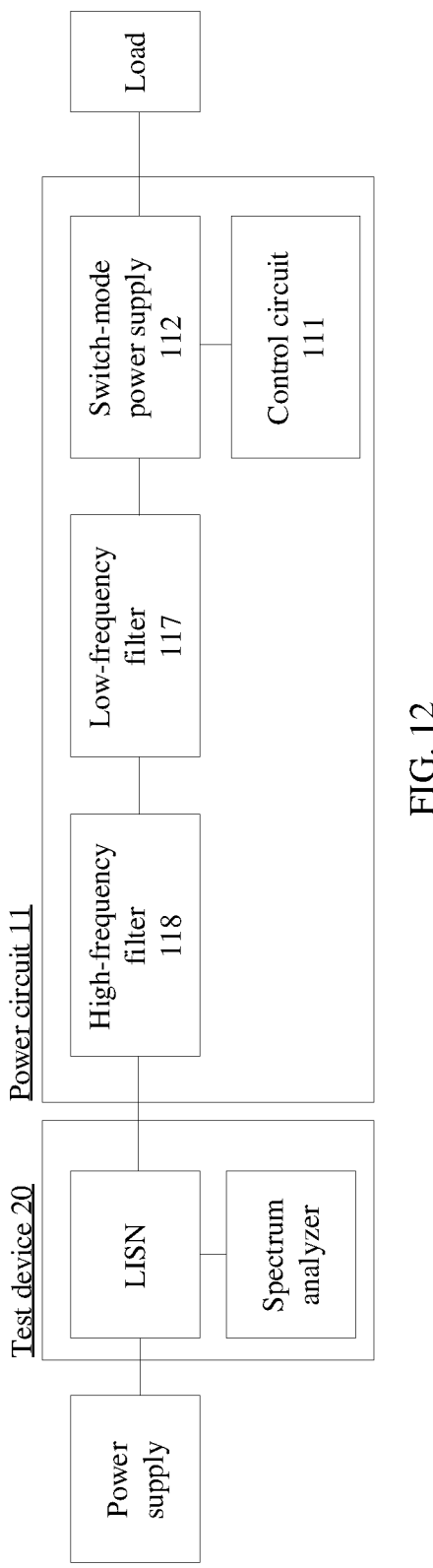
FIG. 12 is a schematic diagram of a scenario in which a conduction test is performed on a power circuit according to an embodiment.

FIG. 12 is a schematic diagram of a scenario in which a conduction test is performed on a power circuit according to the embodiments. As shown in FIG. 12, the conduction test may be performed on the power circuit 11 by using a test device 20. The test device 20 may be any conducted emission test device that complies with a standard, or the like. The test device 20 includes a line impedance stabilization network (LISN) and a spectrum analyzer. A power supply is configured to supply power to the LISN. The power supply may supply power to the LISN through a live wire, a neutral wire, and earth wire (ground).

In an embodiment, the spectrum energy value of the control signal G sent by the control circuit 111 to the switch-mode power supply 112 in the power circuit 11 is reduced. Therefore, when the switching device in the switch-mode power supply 112 is turned on and off based on a control signal G with lower energy, switching noise generated by the switch-mode power supply 112 is reduced from the source. In this way, impedance generated by the power circuit 11 can be reduced. When the impedance in the power circuit 11 is low, a volume and a quantity of low-pass filters in the power circuit 11 may also be correspondingly reduced. Therefore, in this embodiment, a structure of the power circuit 11 can be further simplified, and costs of the power circuit 11 can be reduced. In addition, the power circuit 11 can pass a related security test.

The embodiments further provide an electronic device, including the control circuit 111 provided in any embodiment, or the power circuit 11 provided in any embodiment.

In the foregoing embodiment, a method performed by the control circuit 111 provided in this embodiment is described. To implement the functions in the method provided in the foregoing embodiments, the control circuit 111 that is used as an execution body may include a hardware structure and/or a software module, and implement the functions in a form of the hardware structure, the software module, or a combination of the hardware structure and the software module. Whether a specific function in the foregoing functions is performed by using the hardware structure, the software module, or the combination of the hardware structure and the software module depends on a specific application and a design constraint of the solutions. It should be noted and understood that division of the modules of a foregoing apparatus is merely logic function division. During actual implementation, some or all modules may be integrated into one physical entity, or the modules may be physically separated. The modules may be all implemented in a form of software invoked by a processing element, or may be all implemented in a form of hardware. Alternatively, some modules may be implemented in a form of software invoked by a processing element, and some modules are implemented in a form of hardware. The module may be a processing element separately disposed, or may be integrated in a chip of the foregoing apparatus for implementation. In addition, the module may alternatively be stored in the memory of the foregoing apparatus in a form of program code, and is invoked by a processing element of the foregoing apparatus to perform a function of a foregoing determining module. The other modules are implemented in a similar manner. In addition, all or some of the modules may be integrated together, or may be implemented independently. The processing element herein may be an integrated circuit, and have a signal processing capability. In an implementation process, steps in the method or the modules can be implemented by using a hardware integrated logical circuit in the processing element, or by using instructions in a form of software. For example, the foregoing modules may be one or more integrated circuits configured to implement the foregoing method, for example, one or more application-specific integrated circuits (ASICs), one or more digital signal processors (DSPs), or one or more field-programmable gate arrays (FPGAs). For another example, when one of the foregoing modules is implemented in a form of invoking program code by a processing element, the processing element may be a general-purpose processor, for example, a central processing unit (CPU) or another processor capable of invoking the program code. For another example, these modules may be integrated together and implemented in a form of a system-on-a-chip (SOC).

In the foregoing embodiment, all or some steps performed by the control circuit 111 may be implemented by using software, hardware, firmware, or any combination thereof. When software is used to implement embodiments, all or some embodiments may be implemented in a form of a computer program product. The computer program product includes one or more computer instructions. When the computer program instructions are loaded and executed on a computer, the procedures or functions according to embodiments are all or partially generated. The computer may be a general-purpose computer, a dedicated computer, a computer network, or another programmable apparatus. The computer instructions may be stored in a non-transitory computer-readable storage medium, or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The embodiments further provide a computer-readable storage medium. The computer-readable storage medium stores computer instructions. When the computer instructions are executed, the computer instructions may be used to perform any method performed by the control circuit 111 in the foregoing embodiments.

An embodiment further provides a chip for running instructions. The chip is configured to perform any method performed by the control circuit 111 in the embodiments.

An embodiment further provides a computer program product. The program product includes a computer program. The computer program is stored in a storage medium. At least one processor may read the computer program from the storage medium. When executing the computer program, the at least one processor may implement any method performed by the control circuit 111 in the embodiments.

A person of ordinary skill in the art may understand that all or some of the steps in the foregoing embodiments may be implemented by a program instructing related hardware. The program may be stored in a computer-readable storage medium. When the program is executed, the steps of each method embodiment are performed. The foregoing storage medium includes any medium capable of storing program code, for example, a ROM, a magnetic disk, or an optical disc.

A person of ordinary skill in the art may understand that embodiments are separately described by using functional modules, to facilitate description of the solutions. Circuit components in the modules may partially or completely overlap, and this is not intended as limiting.

It should also be noted that the foregoing embodiments are merely intended for describing the solutions, rather than limiting. Although described in detail with reference to the foregoing embodiments, a person of ordinary skill in the art should understand that they may still make modifications to the solutions described in the foregoing embodiments or make equivalent replacements to some or all features thereof, without departing from the scope of the solutions of the embodiments.

The invention claimed is:

1. A control circuit for a switch-mode power supply, wherein the control circuit is configured to:

output a control signal to control a switching frequency of a switching device in the switch-mode power supply;

adjust, in a plurality of cycles, a frequency of the control signal based on a plurality of ranges;

control, in each cycle of the plurality of cycles, the frequency of the control signal to change with time in a range of the plurality of ranges corresponding to each cycle, wherein at least one of a random duration of a reference cycle and a reference range restricts the change with time; and adjust a duration of at least one cycle of the plurality of cycles based on a random number corresponding to the at least one cycle of the plurality of cycles and the random duration of the reference cycle.

2. The control circuit according to claim 1, wherein a duration of at least one cycle of the plurality of cycles is random.

3. The control circuit claim 1, wherein the control circuit is further configured to:

adjust a duration of at least one cycle of the plurality of cycles, wherein the duration of the at least one cycle is less than or greater than that a duration of a previous cycle.

4. The control circuit according to claim 1, wherein the control circuit is further configured to:

randomly adjust a duration of at least one cycle of the plurality of cycles.

5. The control circuit according to claim 1, wherein the control circuit is further configured to:

adjust an amplitude of at least one range of the plurality of ranges, wherein the amplitude of the at least one range is less than or greater than that an amplitude of a previous range.

6. The control circuit according to claim 1, wherein the control circuit is further configured to:

adjust an amplitude of at least one range of the plurality of ranges to be greater than 90% of an amplitude of the reference range and less than the amplitude of the reference range.

7. The control circuit according to claim 1, wherein the control circuit is further configured to:

adjust an amplitude of least one range based on a random number corresponding to at least one cycle of the plurality of cycles and the reference range.

8. A power circuit, comprising:

a switch-mode power supply, wherein the switch-mode power supply comprises at least one switching device; and a control circuit that is configured to:

output a control signal to control a switching frequency of the switching device, the switching frequency of the switching device changes in a plurality of cycles based on a plurality of ranges, in each cycle of the plurality of cycles, the switching frequency of the switching device changes with time in a range corresponding to each cycle, and at least one of a duration of a reference cycle and a reference range restricts the change with time, and adjust a duration of at least one cycle of the plurality of cycles based on a random number corresponding to the at least one cycle of the plurality of cycles and the duration of the reference cycle.

9. The power circuit according to claim 8, wherein the control circuit further comprises:

a clock source configured to generate a clock signal; and a modulator configured to generate the control signal after modulating the clock signal in the plurality of cycles based on the plurality of ranges.

10. The power circuit according to claim 8, wherein at least one of a duration of at least one cycle of the plurality of cycles and an amplitude of at least one range of the plurality of ranges is random.

11. The power circuit according to claim 8, wherein a duration of at least one cycle of the plurality of cycles is less than or greater than that of a previous cycle.

12. The power circuit according to claim 8, wherein an amplitude at which the switching frequency of the switching device changes with time in at least one cycle of the plurality of cycles is less than or greater than an amplitude at which the switching frequency of the switching device changes with time in a previous cycle.

13. The power circuit according to claim 8, wherein the switch-mode power supply further comprises a boost circuit.

14. The power circuit according to claim 8, wherein the switch-mode power supply further comprises an asymmetrical half-bridge flyback conversion circuit that includes a half-bridge circuit and a transformer.

15. An electronic device, comprising:

a power circuit, wherein the power circuit comprises a switch-mode power supply and a control circuit, wherein the switch-mode power supply comprises at least one switching device, the control circuit is configured to:

output a control signal to control a switching frequency of the switching device, the switching frequency of the switching device changes in a plurality of cycles based on a plurality of ranges, in each cycle of the plurality of cycles, the switching frequency of the switching device changes with time in a range of the plurality of ranges corresponding to each cycle, and at least one of a duration of a reference cycle and a reference range restricts the change with time, and adjust a duration of at least one cycle of the plurality of cycles based on a random number corresponding to the at least one cycle of the plurality of cycles and the duration of the reference cycle.

16. The control circuit according to claim 1, wherein an amplitude of at least one range of the plurality of ranges is random.

17. The control circuit according to claim 1, wherein the control circuit is further configured to:

adjust an amplitude of at least one range of the plurality of ranges to be greater than an amplitude of a reference range and less than 110% of the amplitude of the reference range.

18. The power circuit according to claim 8, wherein the switch-mode power supply further comprises a buck circuit.

19. The power circuit according to claim 8, wherein the switch-mode power supply further comprises a buck-boost circuit.

* * * * *